June 2, 1925.  1,540,640
E. G. LEWIS
TRAP OR SNARE FOR ANIMALS
Filed Dec. 9, 1924   2 Sheets-Sheet 1
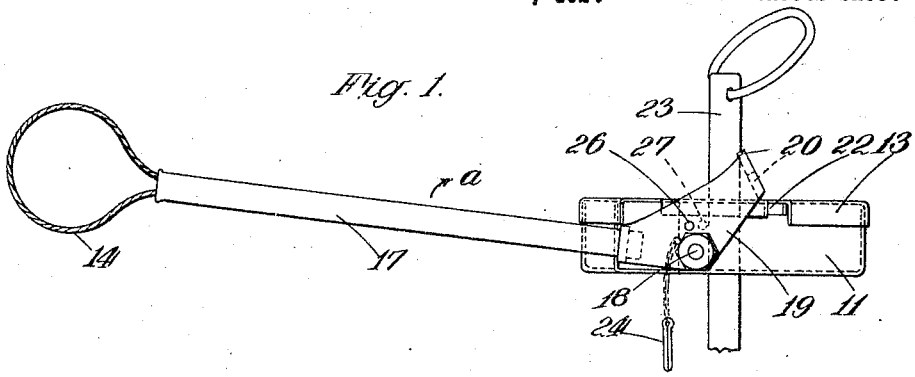
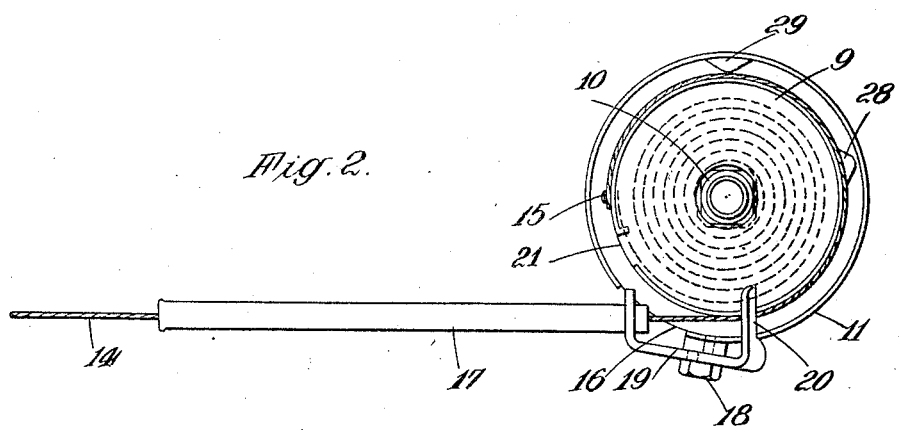
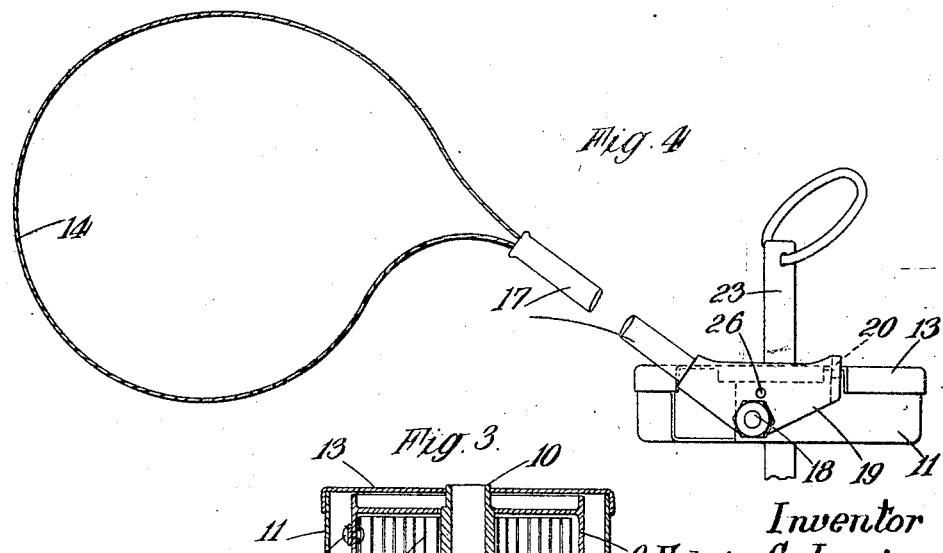
Inventor
Edwin G. Lewis
by Wilkinson & Giusta
Attorneys.

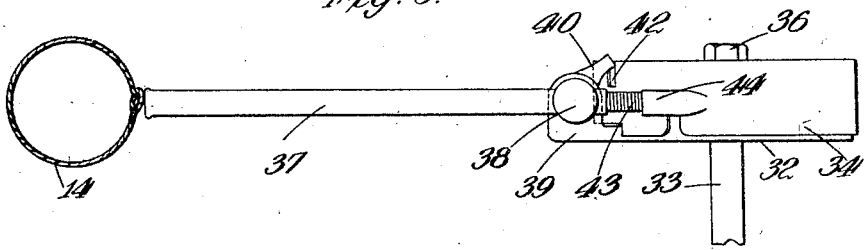
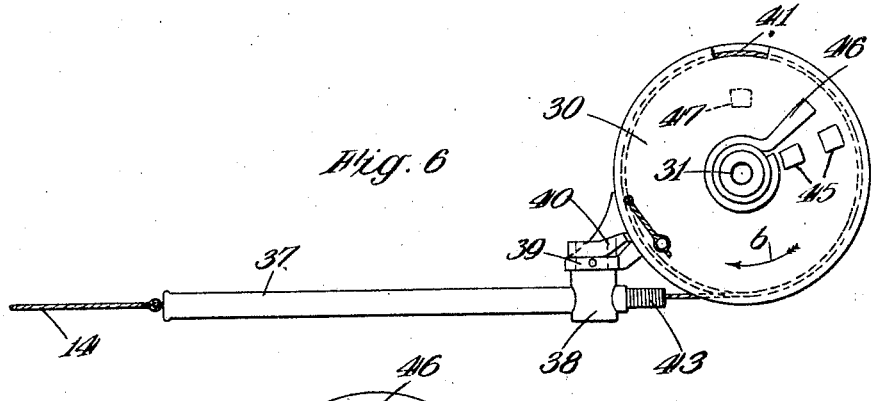
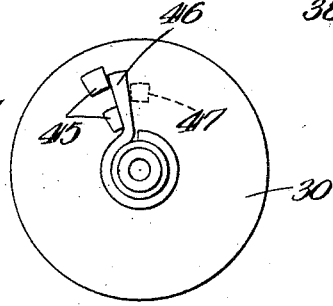
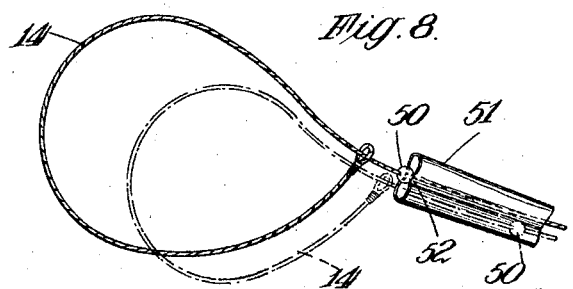

Patented June 2, 1925.

1,540,640

UNITED STATES PATENT OFFICE.

EDWIN GEORGE LEWIS, OF BASINGSTOKE, ENGLAND.

TRAP OR SNARE FOR ANIMALS.

Application filed December 9, 1924. Serial No. 754,774.

*To all whom it may concern:*

Be it known that I, EDWIN GEORGE LEWIS, a British subject, residing in Basingstoke, Hampshire, England, have invented certain new and useful Improvements in and Relating to Traps or Snares for Animals, of which the following is a specification.

This invention relates to improvements in traps or snares for catching animals such as rabbits for example and has for its object to provide a trap of simple construction which will kill any animal humanely and practically instantaneously.

It has been proposed to construct a trap comprising a spring snare or loop attached to a spring barrel, the latter being rotatably mounted in the ground and fitted with ratchet mechanism and a trigger, the arrangement being such that when the trap is set and an animal places its head in the snare it also touches the trigger, releasing the spring barrel and causing the snare to be tightened.

Such a trap, however, does not kill the animal, but simply imprisons it and the animal is left to struggle for a long time until it is suffocated, for example.

According to the present invention a trap of the kind in which a spring barrel secured to the ground is employed for tightening the noose, loop or the like, is provided with a guide in the form of a tubular arm which supports the noose in the desired position in the run or the like, the draw string of the noose or the like passing down through the arm to the barrel, the arm at either end being constructed and adapted so as to hold the spring barrel in the set position.

Movement of the noose, as by an animal entering same for example, causes the holding means to be disengaged and the spring winds up the noose or loop, strangling the animal against the mouth of the tubular arm.

In a suitable construction according to the invention the trap comprises a spring barrel adapted to be placed on the ground and a pivoted tubular arm attached thereto, the draw string of a noose passing through the arm and being secured to the spring barrel. The spring barrel may be contained in a casing and mounted on a suitable base plate, the whole being held in the ground by a pin.

A stop is provided on the arm near its pivot which stop when the arm is in position and the trap is set, engages the spring barrel and prevents the spring from drawing in the noose or the like.

With the above described arrangement, if when the trap is set an animal enters the noose or the like, the pull on the noose moves the arm releasing the spring barrel and causing the spring to wind up the string or wire of the noose rapidly, thus tightening the noose and killing the animal.

The trap may be used with a running nose or a looped string, as hereinafter described.

In a further modification of the invention the string of the noose or the like is provided with a stop and the mouth of the arm is provided with a portion which engages the stop when the trap is set, said stop being displaced when an animal enters the noose and passing into the tube, allowing the spring to tighten the noose.

Means may also be provided for locking the trap in the set position.

To enable the invention to be fully understood it will now be described by reference to the accompanying drawings in which:—

Fig. 1 is a side elevation of a trap constructed according to one form of the invention, and Fig. 2 is a plan view thereof with the cap or cover of the trap removed, the trap being in the unset position;

Fig. 3 is a sectional view of the spring barrel of the trap, and

Fig. 4 is a side elevation shewing the trap in the set position.

Fig. 5 is a side elevation of a modified construction of trap in the unset position, and Fig. 6 is a plan view thereof with the cover of the trap removed to shew the stop mechanism.

Fig. 7 is a detail of the top of the spring barrel shewing the stops in the set position of the trap;

Fig. 8 is a view of a portion of a trap constructed according to a further form of the invention.

Referring first to the example illustrated in Figs. 1–4, the trap comprises a spring barrel 9 rotatably mounted upon a hollow shaft 10 carried on the bottom of a casing 11 (Fig. 3). One end of the coiled spring 12 is secured to the barrel 9, the other end being secured to the shaft 10 as will be understood. The casing 11 is fitted with a cover 13. The snare, here shewn as a looped wire 14 is secured to the barrel 9 at 15 passing through an opening 16 in the casing and up through a tubular arm 17, pivotally attached to the casing at 18. The arm 17 is mounted in a bracket member 19 which is pivoted on the bolt 18, one end 20 of the bracket acting as a stop for engaging the spring barrel when the trap is set. The upper edge of the barrel 9 is cut away at 21 to form a stop and the casing 11 and cover 13 are cut away at 22 to allow the stop 20 to enter the casing.

With this construction, to set the trap, the wire 14 is drawn out revolving the barrel 9 against its spring, and the arm 17 is moved in the direction of the arrow a, Fig. 1, into the position shewn in Fig. 4, in which the stop 20 enters the casing and engages the rim of the barrel. When the stop 20 meets the cut out portion 21 of the barrel the trap is set, since the barrel is held against the tension of the spring 12. If now an animal enters the loop 14 it pulls on the loop causing the arm 17 to move downwards, withdrawing the stop 20, releasing the barrel and causing the wire to be drawn rapidly around the barrel, strangling the animal against the end of the arm 17. The parts are now in the position shewn in Fig. 1.

The trap may be pivotally secured to the ground by a pin 23 passed through the shaft 10, or in any other suitable manner.

For locking the trap in the set position a pin 24 is provided adapted to be inserted in holes 26, 27 in the bracket 19 and casing respectively, said holes being coincident when the arm 17 is raised as in Fig. 4. When the pin is in position the arm 17 cannot be moved, so the trap is locked in the set position.

Stops 28, 29 on the barrel 9 and the bottom of the casing respectively may be provided for limiting the rotation of the barrel when the trap is being set, the stop being so arranged that when the loop 14 is fully extended, the cut out portion 21 on the barrel is in position to be engaged by the stop 20 on the bracket 19. A running noose may be substituted for the loop 14. Preferably the loop 14 is of such a length that one revolution of the barrel 9 is sufficient to operate the trap successfully.

In the example shewn in Figs. 5–7, a trap is shewn in which a running noose 14 is used which requires to be wrapped twice round the spring barrel to work the trap effectively.

With this arrangement it is essential that the trap should not be set until the full length of the wire has been drawn out, that is to say, until the barrel has performed two revolutions.

To this end a limit stop is provided and the wire is pulled out in setting the trap until further rotation of the barrel is positively prevented by the stop.

The spring barrel 30 in this example is rotatably mounted on a shaft 31 secured to the bottom of the casing 32, the latter having a pin 33 on its underside for entering the ground. A cover 34 is provided which is secured by a bolt 36 (Fig. 5) which is screwed into the shaft 31. The tubular arm 37 is pivoted at 38 to a bracket 39 formed on an extension of the bottom of the casing and is fitted with a stop piece 40. The rim of the barrel 30 is cut away at 41 to form a stop and the casing 32 and cover 34 are also cut away at 42 to allow the stop 40 to enter and engage the barrel when the trap is set as previously described. The draw string of the noose 14 is passed down the tubular arm 37 through a flexible guide 43 on the end of the tube and through a guide 44 on the cover (Fig. 5) and then twice round the spring barrel.

To provide a limit stop as mentioned above, the top of the barrel is fitted with two stops 45, spaced apart (Fig. 6), a pawl member 46 loosely mounted on the shaft 31, and a stop 47 is also provided on the inside of the cover 34 (shewn dotted in Figs. 6 and 7). The stop 47 is so positioned that when the barrel is rotated said stop will pass between the stops 45 unless prevented by the pawl 46.

In setting the trap, the parts are first in the position shewn in Fig. 6. On pulling out the wire 14 the barrel rotates in the direction of the arrow b to wind the spring and since the pawl 46 is loosely mounted, the barrel is allowed to make one complete revolution unchecked. At the end of the second revolution, however, the pawl 46 becomes jammed between the stops 47 and 45 as shewn in Fig. 7 and thus further movement of the barrel is prevented.

The operator is thus aware that the wire 14 is fully extended and raises the arm 37 so that the stop 40 enters the casing and engages the stop 41 on the barrel and the trap is set. The trap operates as before described with reference to Figs. 1–4.

A loop may be substituted for the noose if desired and a locking pin similar to the pin 24, Fig. 1, may be used for locking the arm 37 in the set position.

Further the stop mechanism illustrated in Figs. 6 and 7 may also be applied to a trap constructed as shewn in Figs. 1–4 if desired.

In Fig. 8 a form of trap is shewn in which the noose 14 is fitted with a ball-shaped stop 50 and the mouth of the pivoted tubular arm 51 of the trap is shaped as shewn, forming a central portion 52 of small diameter which allows the wire to pass therethrough, but not the ball. The portions on either side of the portion 52 are wide enough to allow the ball to enter the tube.

To set the trap the wire 14 is pulled until the ball 50 is in position resting on the portion 52 of the tube as shewn in full lines, Fig. 8.

In this position the barrel is held against the tension of its spring. If an animal enters the noose the ball 51 slips into the tube allowing the spring to tighten the noose as will be readily understood.

It will be obvious that the tubular arm may be replaced by a guide member such as a rod having guide loops thereon through which the snare wire is passed. The expression "tubular arm" used herein is intended to cover all equivalent constructions.

Having thus described the nature of my said invention and the best means I know of carrying the same into practical effect, I claim:—

1. In a trap and in combination, a spring barrel, means for rotatably mounting the barrel on the ground, a guide member attached to the barrel, and a draw string movably carried by the guide member and attached to the spring barrel, the guide member being constructed to hold the spring barrel in the set position.

2. In a trap and in combination, a casing, a spring barrel rotatably mounted within the casing, a guide member pivoted to the casing, a draw string movably carried by the guide member and attached to the spring barrel, and a stop on the guide member adapted to engage the spring barrel to hold same in the set position.

3. In a trap and in combination, a casing, a ground pin attached to the casing, a spring barrel rotatably mounted within the casing, a guide member pivoted to the casing, a looped string movably carried by the guide member and attached to the spring barrel and a stop on the guide member for engaging the spring barrel in one position of the guide member.

4. In a trap and in combination, a casing, a spring barrel rotatably mounted within the casing, a tubular arm pivoted to the casing, a looped string passing through the arm and attached to the spring barrel, and a stop on the arm adapted to engage the spring barrel to hold same in the set position.

5. In a trap and in combination, a casing, a ground pin attached to the casing, a spring barrel rotatably mounted within the casing, a tubular arm pivoted to the casing, a draw string passing through the arm and attached to the spring barrel, and a stop on the arm adapted to engage the spring barrel in one position of the tubular arm.

6. In a trap and in combination, a casing, a spring barrel rotatably mounted in the casing, a stop on the barrel, a stop on the casing, the two stops co-operating to allow the barrel to make two revolutions only, a guide member pivoted to the casing, a looped string movably carried by the guide member and attached to the spring barrel and a stop on the guide member adapted to engage the spring barrel in one position of the guide member.

7. A trap comprising a noose carried on a movable guide member and attached to a spring mechanism adapted to be rotatably mounted on the ground, the guide member being constructed to hold the spring mechanism set in one position and to release the mechanism when moved into another position so that the noose is wound up by the spring mechanism.

8. A trap comprising a looped string carried on a movable guide member, the ends of the loop being attached to a spring barrel rotatably mounted in a slotted casing adapted to be rotatably mounted on the ground, the guide member being pivotally attached to the casing and having a stop adapted to engage the spring barrel through a slot in the casing when the trap is set and to release the spring barrel to allow the latter to tighten the loop when an animal moves the guide member by becoming entangled in the loop.

9. A trap comprising a casing, a spring barrel mounted in the casing, a stop on the casing, a stop on the barrel, locking means pivoted to said casing and adapted to simultaneously engage the two stops when the trap is in set position, guide means secured to said locking means, and a looped string carried by the spring barrel extending along said guide means and outwardly therefrom.

10. A trap comprising a casing, a spring barrel rotatably mounted in the casing, anchoring means carried by the casing for anchoring the same in the desired location, a stop on the casing, a stop on the barrel, locking means pivotally secured to said casing and adapted to simultaneously engage the two stops when the trap is in set position, a tubular arm carried by said guide means, and a looped string mounted at one end on the periphery of the barrel and extending outwardly through said tubular arm.

11. A trap comprising a casing, a spring barrel rotatably mounted in the casing, anchoring means carried by the casing for anchoring the same in the desired location, a pair of spaced stops mounted on the barrel, a stop mounted on the casing and adapted to pass between said pair of stops, a pawl loosely mounted on the barrel, said pawl being adapted to be interposed between the stops when the barrel has made two revolutions, said barrel having a notch in the periphery thereof, said casing having a notch therein, a locking arm pivotally carried by the casing and adapted to engage the two notches when the trap is in set position, guide means carried by said locking arm, and a looped string secured at one end to the periphery of the spring barrel and extending outwardly along said guide means.

12. A trap comprising a casing, a spring barrel mounted in the casing, means for anchoring the casing to the ground, stop means carried by the casing and the barrel for stopping the barrel when it has made two revolutions, said casing having a notch therein, said barrel having a notch therein adapted to register with the notch in the casing when the trap is in set position, a trip arm pivotally mounted on the casing, said arm being adapted to simultaneously engage the two notches for holding the barrel in set position, a tube carried by said trip arm, and a looped string secured at one end to the barrel and extending through and beyond the tube at its other end.

13. A trap comprising a casing having a notch therein, a spring barrel mounted in the casing and having a notch therein registering with the notch in the casing when the trap is set, locking means pivoted to said casing, said locking means being adapted to engage the notches in the barrel and the casing, guide means carried by said locking means, and a looped string mounted on the barrel and loosely engaging said guide means.

In testimony whereof I have signed my name to this specification.

EDWIN GEORGE LEWIS.